Jan. 5, 1926.  
E. RIMAILHO  
1,568,241  
TRAVELING TRACK DEVICE WITH PNEUMATIC SUSPENSION  
Filed Jan. 31, 1923  2 Sheets-Sheet 1
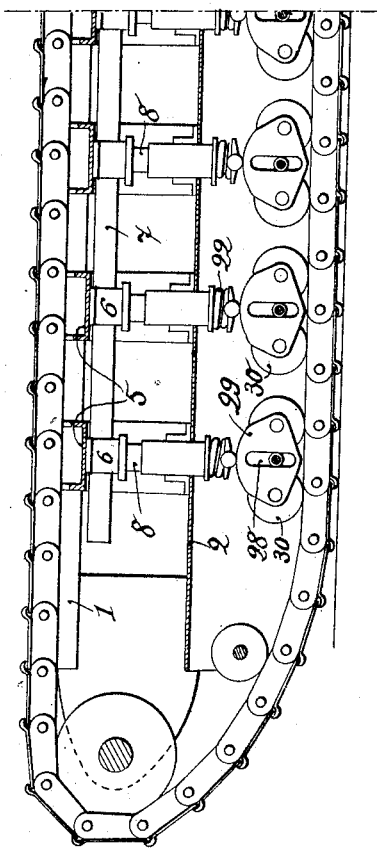
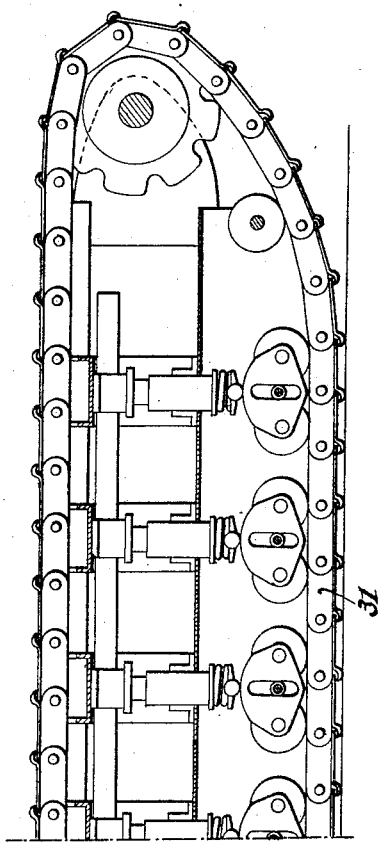
Inventor  
E. Rimailho,  
By Marks&Clerk  
Attys.

Jan. 5, 1926. 1,568,241
E. RIMAILHO
TRAVELING TRACK DEVICE WITH PNEUMATIC SUSPENSION
Filed Jan. 31, 1923   2 Sheets-Sheet 2
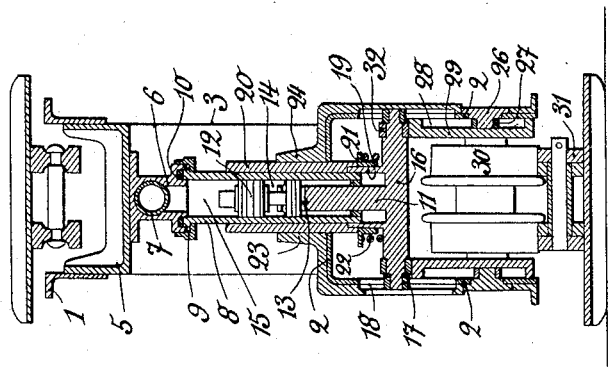
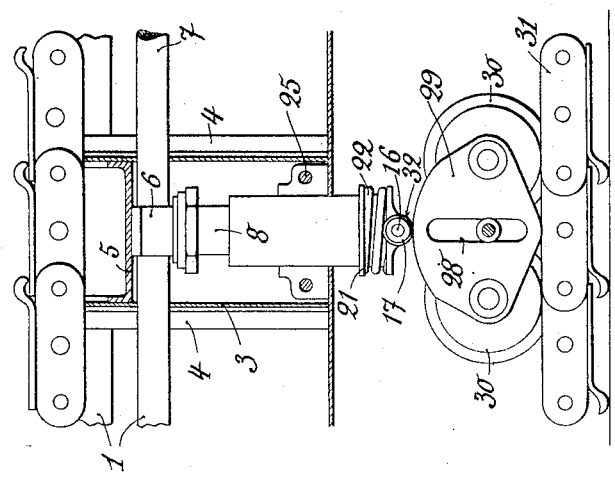
Inventor
E. Rimailho,
By Marks&Clerk
Attys.

Patented Jan. 5, 1926.

1,568,241

UNITED STATES PATENT OFFICE.

EMILE RIMAILHO, OF PARIS, FRANCE, ASSIGNOR TO COMPAGNIE DES FORGES & ACIERIES DE LA MARINE & D'HOMECOURT, OF PARIS, FRANCE, A COMPANY.

TRAVELING TRACK DEVICE WITH PNEUMATIC SUSPENSION.

Application filed January 31, 1923. Serial No. 616,192.

*To all whom it may concern:*

Be it known that I, EMILE RIMAILHO, a citizen of the Republic of France, and residing at Paris, Seine Department, No. 12 Rue de la Rochefoucauld, in the Republic of France, have invented certain new and useful Improvements in Traveling Track Devices with Pneumatic Suspensions, of which the following is a specification.

This invention relates to a vehicle with endless or traveling track, provided with a pneumatic suspension arrangement whereby the load can be distributed between the various carriages supported by the traveling tracks, in spite of the inequalities of the ground, and the strain upon the mechanical parts can be reduced in order to travel at a high speed without inconvenience.

Furthermore, the elasticity of the suspension device can be regulated according to the load to be carried.

For this purpose, the carriages are acted upon by pistons which are vertically movable in cylinders secured to the vehicle frame and containing gas or air under pressure, and said cylinders are connected together in groups either in the same traveling track device or in both devices of the vehicle by a suitable conduit whereby the pressure of the fluid shall be always the same upon all the pistons of the cylinders connected together.

In order to allow of easy dismounting of the mechanism, the cylinders are secured to the frame by means of threaded rings and the pistons bear upon the carriages through the interposition of rollers adapted to roll upon the flanges of these carriages. Further, to allow the vehicle to progress in a case where it would be impossible to maintain the pressure in the cylinders, relief springs are interposed between the bottom of the said cylinders and the lower face of the pistons.

The appended drawing shows by way of example one embodiment of the invention.

Figs. 1 and 1ª show two portions of a diagrammatic lengthwise section on the axis of the traveling track frame, with the movable elements such as the carriages and pistons seen in elevation.

Fig. 2 is a partial view of like parts on a larger scale.

Fig. 3 is a corresponding cross-section.

The structure of the traveling track holder as shown in Figs. 1 to 3 comprises at the upper part two structural steel beams, for instance of angle iron 1, and at the lower part a plate 2 having the shape of an inverted U. These two parts are connected together adjacent the carriages by the transverse sheet iron cross-pieces 3, which are strengthened by the angle brackets 4, so as to make up a structure than cannot be put out of shape.

The members 1 are crossed-braced next the carriages by the pieces 5, for example of a channel shape, to which are also secured the plates 3 and the angle brackets 4. The pieces 5 have attached thereto the boxes 6 cross-connected by the tube 7 and having downwardly extending therefrom the cylinders 8 held by the threaded rings 9, with the use of the packing 10.

Within the cylinders 8 are slidable the piston rods 11 having thereupon a packing arrangement comprising in the known manner, a tight packing of plastic material, lubrication for example, which is contained in the space 14 provided between the two piston elements 12, 13, and in which the pressure is always higher than the pressure on either side of the packing, thus obviating all leakage of gas and air.

The rods 11 are secured to the cross bars 16 carrying two rollers 17 which are guided in the apertures 18 formed in the plates 2. The said bars have a collar 19 whereon is mounted a tube 20 which is slidable in the plates 2 along the cylinder 8. Upon the said collar 19 is movable a ring 21 which bears upon the bar 16 through the medium of a spring 22. Opposite this carriage, the members 23 and 24 are secured to the plate 2 so as to form a flange, and they are assembled by the bolts 25; said members carry the plates 26 having mounted thereon the rollers 27 which are slidable in slots 28 formed in the cheeks 29 of the carriages; these latter are provided with the rollers 30 mounted between the said cheeks and bearing upon the endless chain 31. On the other hand the cheeks 29 bear upon the bars 16 by means of the rollers 32.

Gas or air at the necessary pressure is confined once for all in the spaces 15 connected by the tube 7, or the pressure is maintained in said spaces by a pump driven by the engine of the vehicle, for example. When by reason of a slope in the ground one of the carriages is urged upwardly, the cheeks 29 will bear upon the bar 16 in the respective case, and will move the piston rod 11 upwardly in the cylinder 8, and the resulting variation of pressure is distributed throughout all the spaces 15 connected together by the tube 7.

A traveling track device thus arranged will form a very flexible device which is capable of absorbing the shocks at all points and can fit upon the same after the manner of a pneumatic tire, and in this manner great speeds of travel can be obtained. According to the load on the vehicle, one can vary the pressure of the fluid so as to maintain the proper flexibility of operation in all cases, and furthermore the masses of the fluid in the two traveling tracks may be connected together by a conduit. Gate-valves, not shown, can be mounted in order to divide the cylinders into groups in which the gas or air pressure may be different, if necessary, and may be regulated according to the distribution of the weight supported upon the various carriages. Should a leakage occur, the rings 21 will bear upon the cross-bars 16; the elasticity of the springs 22 mounted between the bars 6 and the said plate will come into action, and the apparatus may continue to travel at reduced speed. In this event the said gate-valves will serve to isolate the cylinders which leak.

Obviously, the said device is adapted for use with traveling tracks of all types, irrespectively of the framework or endless belt which is used in the same.

Claims:

1. A suspension device for vehicles comprising traveling tracks, supports for said tracks, carriages adapted to bear upon these tracks and to move vertically, means for guiding these carriages in the supports of the traveling tracks, pistons submitted to the action of a fluid under pressure, the lower ends of which bear upon the said carriages, vertical cylinders in which these pistons are movably mounted, and threaded sleeves which maintain these cylinders upon the said support of the traveling track.

2. A suspension device for vehicles comprising traveling tracks, supports for the traveling tracks, carriages adapted to bear upon these tracks and to be moved vertically, cheeks on said carriages, means for guiding these carriages in the supports of the traveling tracks, pistons submitted to the action of a fluid under pressure, vertical cylinders in which these pistons are adapted to move, threaded sleeves which maintain these cylinders upon the said supports of the traveling tracks, cross pieces connected with the lower ends of the pistons, rollers mounted upon these pieces and bearing upon the cheeks of the carriages, and other rollers mounted upon the said cross pieces, the said supports for the traveling tracks being provided with guiding slots in which the said cross-pieces are slidable.

3. A suspension device for vehicles comprising traveling tracks, supports for the traveling tracks, carriages adapted to bear upon these tracks, and to move vertically, cheeks on the carriages, means for guiding these carriages relatively to the supports of the traveling tracks, pistons submitted to the action of a fluid under pressure, vertical cylinders having these pistons movable therein, threaded sleeves which maintain these cylinders upon said supports, cross pieces connected with the lower ends of the pistons, sleeves connected with these cross pieces and adapted to slide upon the cylinders, rollers mounted upon these pieces and bearing upon the cheeks of the carriages, and other rollers mounted upon the said cross pieces, the said supports being provided with guiding slots in which the said cross pieces are slidable.

4. A suspension device for vehicles comprising traveling tracks, supports for the traveling tracks, carriages adapted to bear upon these tracks and to move vertically, cheeks on the carriages, means for guiding these carriages relatively to the supports, pistons submitted to the action of a fluid under pressure, vertical cylinders having these pistons movable therein; threaded sleeves which maintain these cylinders upon the said supports, cross pieces connected with the lower ends of the pistons, sleeves connected with these cross pieces and adapted to slide upon the cylinders, collars slidable on said sleeves and adapted to abut against said supports, stop springs interposed between said collars and the cross-pieces, rollers mounted upon said cross-pieces and bearing upon the cheeks of the carriages, and other rollers mounted upon the said cross pieces, the said supports being provided with guiding slots in which the said cross pieces are slidable.

In testimony that I claim the foregoing as my invention, I have signed my name.

EMILE RIMAILHO.